United States Patent
Suzuki

(10) Patent No.: US 11,632,180 B2
(45) Date of Patent: *Apr. 18, 2023

(54) COHERENT OPTICAL RECEIVER DEVICE AND COHERENT OPTICAL RECEIVING METHOD

(71) Applicant: NEC CORPORATION, Tokyo (JP)

(72) Inventor: Kouichi Suzuki, Tokyo (JP)

(73) Assignee: NEC CORPORATION, Tokyo (JP)

(*) Notice: Subject to any disclaimer, the term of this patent is extended or adjusted under 35 U.S.C. 154(b) by 86 days.

This patent is subject to a terminal disclaimer.

(21) Appl. No.: 17/219,256

(22) Filed: Mar. 31, 2021

(65) Prior Publication Data

US 2021/0218475 A1 Jul. 15, 2021

Related U.S. Application Data

(63) Continuation of application No. 16/901,796, filed on Jun. 15, 2020, now Pat. No. 10,985,844, which is a
(Continued)

(30) Foreign Application Priority Data

Nov. 18, 2010 (JP) .............................. JP2010-258021

(51) Int. Cl.
*H04B 10/61* (2013.01)
*H04B 10/079* (2013.01)
(Continued)

(52) U.S. Cl.
CPC ..... *H04B 10/6151* (2013.01); *H04B 10/0795* (2013.01); *H04B 10/61* (2013.01);
(Continued)

(58) Field of Classification Search
CPC .. H04B 10/0795; H04B 10/61; H04B 10/612; H04B 10/613; H04B 10/614;
(Continued)

(56) References Cited

U.S. PATENT DOCUMENTS 6,600,594 B1    7/2003    Ko et al.
7,356,256 B1    4/2008    Strawczynski et al.
(Continued)

FOREIGN PATENT DOCUMENTS

JP    2001-249053 A    9/2001
JP    200949613 A    3/2009
(Continued)

OTHER PUBLICATIONS

Zhang et al; Design of coherent receiver optical front end for unamplified applications; Optical society of America; Jan. 2012. (Year: 2012).*

(Continued)

*Primary Examiner* — Amritbir K Sandhu
(74) *Attorney, Agent, or Firm* — Sughrue Mion, PLLC

(57) ABSTRACT

In a coherent optical receiver device, the dynamic range considerably decreases in the case of selectively receiving the optical multiplexed signals by means of the wavelength of the local oscillator light, therefore, a coherent optical receiver device according to an exemplary aspect of the invention includes a coherent optical receiver receiving optical multiplexed signals in a lump in which signal light is multiplexed; a variable optical attenuator; a local oscillator connected to the coherent optical receiver; and a first controller controlling the variable optical attenuator by means of a first control signal based on an output signal of the coherent optical receiver; wherein the coherent optical receiver includes a 90-degree hybrid circuit, a photoelectric converter, and an impedance conversion amplifier, and selectively detects the signal light interfering with local oscillation light output by the local oscillator out of the optical multiplexed signals; and the variable optical attenuator is disposed in the optical path of the optical multiplexed signals in a stage preceding the photoelectric converter,
(Continued)

inputs the optical multiplexed signals, and outputs them to the coherent optical receiver controlling the intensity of the optical multiplexed signals based on the first control signal.

17 Claims, 10 Drawing Sheets

Related U.S. Application Data continuation of application No. 16/576,081, filed on Sep. 19, 2019, now Pat. No. 10,720,998, which is a continuation of application No. 16/014,160, filed on Jun. 21, 2018, now Pat. No. 10,454,589, which is a continuation of application No. 14/700,280, filed on Apr. 30, 2015, now Pat. No. 10,033,468, which is a continuation of application No. 13/885,266, filed as application No. PCT/JP2011/072692 on Sep. 26, 2011, now Pat. No. 9,048,956.

(51) Int. Cl.
  *H04J 14/02* (2006.01)
  *H04J 14/06* (2006.01)
(52) U.S. Cl.
  CPC ......... *H04B 10/612* (2013.01); *H04B 10/613* (2013.01); *H04B 10/614* (2013.01); *H04B 10/615* (2013.01); *H04J 14/02* (2013.01); *H04J 14/06* (2013.01)
(58) Field of Classification Search
  CPC ... H04B 10/615; H04B 10/6151; H04J 14/02; H04J 14/06
  USPC ....................................... 398/9–34
  See application file for complete search history.

(56) References Cited

U.S. PATENT DOCUMENTS

| | | | |
|---|---|---|---|
| 7,769,305 B1 | 8/2010 | Roberts et al. | |
| 7,809,284 B2 | 10/2010 | Kaneda et al. | |
| 7,899,340 B1 | 3/2011 | Bontu et al. | |
| 7,936,999 B1* | 5/2011 | Hawryluck | H04L 7/0075 398/208 |
| 8,059,958 B1 | 11/2011 | Jiang et al. | |
| 8,249,464 B2 | 8/2012 | Oda et al. | |
| 8,301,039 B2 | 10/2012 | Nishihara et al. | |
| 8,374,512 B2* | 2/2013 | Tao | H04B 10/61 398/205 |
| 8,600,242 B2 | 12/2013 | Ji et al. | |
| 8,649,689 B2 | 2/2014 | Koizumi et al. | |
| 8,649,690 B2 | 2/2014 | Gehrke et al. | |
| 8,705,986 B2 | 4/2014 | Sun et al. | |
| 8,768,178 B2 | 7/2014 | Khatana et al. | |
| 8,774,644 B2 | 7/2014 | Sun et al. | |
| 8,805,206 B2 | 8/2014 | Roberts et al. | |
| 8,965,221 B2 | 2/2015 | Hironishi et al. | |
| 9,048,956 B2 | 6/2015 | Suzuki | |
| 9,100,129 B2 | 8/2015 | Baney | |
| 9,246,599 B2 | 1/2016 | Yasuda et al. | |
| 9,647,753 B1* | 5/2017 | Kurisu | H04J 14/0221 |
| 9,692,545 B2* | 6/2017 | Yamauchi | H04B 10/61 |
| 9,762,333 B2 | 9/2017 | Komatsu | |
| 10,033,468 B2* | 7/2018 | Suzuki | H04B 10/612 |
| 10,187,174 B2* | 1/2019 | Yamauchi | H04J 14/0221 |
| 10,447,387 B2* | 10/2019 | Yamamoto | H04B 10/03 |
| 2002/0060837 A1 | 5/2002 | Inagaki et al. | |
| 2004/0004755 A1 | 1/2004 | Roberts et al. | |
| 2004/0022495 A1 | 2/2004 | Shapiro et al. | |
| 2004/0062557 A1* | 4/2004 | Takashima | H04B 10/674 398/209 |
| 2004/0114939 A1 | 6/2004 | Taylor | |
| 2007/0045253 A1 | 3/2007 | Jordens | |
| 2008/0145066 A1* | 6/2008 | Hoshida | H04B 10/61 398/205 |
| 2008/0218848 A1 | 9/2008 | Mino | |
| 2009/0047030 A1* | 2/2009 | Hoshida | H04B 10/61 398/205 |
| 2009/0226189 A1* | 9/2009 | Ito | H04B 10/65 398/202 |
| 2009/0317092 A1* | 12/2009 | Nakashima | H04B 10/65 398/204 |
| 2010/0054754 A1 | 3/2010 | Miller et al. | |
| 2010/0150478 A1 | 6/2010 | Murray | |
| 2010/0178065 A1* | 7/2010 | Nishihara | H04B 10/613 341/137 |
| 2010/0254718 A1* | 10/2010 | Oda | H04B 10/60 398/202 |
| 2010/0260504 A1 | 10/2010 | Takahara | |
| 2010/0284694 A1 | 11/2010 | Yoshida et al. | |
| 2011/0150503 A1 | 6/2011 | Winzer | |
| 2011/0217040 A1 | 9/2011 | Mori | |
| 2011/0229137 A1* | 9/2011 | Gripp | H04J 14/0204 398/65 |
| 2011/0236025 A1 | 9/2011 | Wagner et al. | |
| 2011/0255879 A1 | 10/2011 | Xie et al. | |
| 2011/0291865 A1 | 12/2011 | Sun | |
| 2012/0057863 A1 | 3/2012 | Winzer et al. | |
| 2012/0057884 A1* | 3/2012 | Zhao | H04B 10/69 398/209 |
| 2012/0069854 A1* | 3/2012 | Suzuki | H04J 14/06 370/465 |
| 2012/0076506 A1* | 3/2012 | Goebuchi | H04B 10/615 398/202 |
| 2012/0170926 A1* | 7/2012 | Van Leeuwen | H04B 10/0795 398/9 |
| 2012/0269514 A1 | 10/2012 | Nedovic | |
| 2012/0294629 A1 | 11/2012 | Zhou | |
| 2012/0321300 A1 | 12/2012 | Sueoka | |
| 2013/0071109 A1* | 3/2013 | Khatana | H04B 10/6164 398/116 |
| 2013/0094852 A1 | 4/2013 | Tao et al. | |
| 2013/0156424 A1* | 6/2013 | Youn | H04B 10/614 398/38 |
| 2013/0170843 A1 | 7/2013 | Baney | |
| 2013/0209089 A1 | 8/2013 | Harley et al. | |
| 2013/0216239 A1 | 8/2013 | Zhang et al. | |
| 2013/0236172 A1* | 9/2013 | Suzuki | H04J 14/06 398/43 |
| 2013/0287393 A1* | 10/2013 | Morie | H04B 10/65 398/38 |
| 2013/0336665 A1* | 12/2013 | Suzuki | H04B 10/65 398/208 |
| 2013/0343715 A1* | 12/2013 | Kolis | C30B 29/64 428/64.1 |
| 2013/0343751 A1 | 12/2013 | Mamyshev | |
| 2014/0231628 A1 | 8/2014 | Miyatake | |
| 2014/0286651 A1 | 9/2014 | Takechi | |
| 2016/0142152 A1* | 5/2016 | Murakami | H04J 14/0221 398/79 |
| 2020/0014466 A1 | 1/2020 | Suzuki | |

FOREIGN PATENT DOCUMENTS

| | | |
|---|---|---|
| JP | 2009-212994 A | 9/2009 |
| JP | 2010161721 A | 7/2010 |
| JP | 2010-245772 A | 10/2010 |
| WO | 2010021669 A2 | 2/2010 |

OTHER PUBLICATIONS

Office Action dated May 13, 2014, issued by the Japan Patent Office in corresponding application No. 2012-544147.
Roy et al; RMS power; Nov. 18, 2004 (modified); pp. 1-6.

* cited by examiner

COHERENT OPTICAL RECEIVER DEVICE AND COHERENT OPTICAL RECEIVING METHOD

CROSS REFERENCE TO RELATED APPLICATIONS

This application is a Continuation application of U.S. application Ser. No. 16/901,796 filed Jun. 15, 2020, now U.S. Pat. No. 10,985,844 issued Apr. 20, 2021, which is a Continuation application of U.S. application Ser. No. 16/576,081 filed Sep. 19, 2019, now U.S. Pat. No. 10,720,998 issued Jul. 21, 2020, which is a Continuation Application of U.S. application Ser. No. 16/014,160 filed Jun. 21, 2018, now U.S. Pat. No. 10,454,589 issued Oct. 22, 2019, which is a Continuation Application of U.S. application Ser. No. 14/700,280 filed Apr. 30, 2015, now U.S. Pat. No. 10,033,468 issued Jul. 24, 2018, which is a Continuation Application of U.S. application Ser. No. 13/885,266 filed May 14, 2013, now U.S. Pat. No. 9,048,956 issued Jun. 2, 2015, which is a National Stage of International Application No. PCT/JP2011/072692, filed Sep. 26, 2011, claiming priority from Japanese Patent Application No. 2010-258021, filed Nov. 18, 2010, the contents of all of which are incorporated herein by reference in their entireties.

TECHNICAL FIELD

The present invention relates to coherent optical receiver devices and coherent optical receiving methods, in particular, to a coherent optical receiver device and a coherent optical receiving method which receive optical multiplexed signals by means of coherent detection.

BACKGROUND ART

It is required to further enlarge the capacity in a backbone transmission system as the amount of information (traffic) in the Internet increases. A coherent optical transmission technology has drawn attention as one of technologies for high capacity. In the coherent optical transmission technology, an AC (Alternating Current) signal component is received which is amplified by mixing signal light and LO (Local Oscillator) light in a coherent optical receiver device. At that time, the larger the optical output of the local oscillator (LO) light becomes, the larger amplifying operation acts on the signal light. Therefore, the receiving characteristics with the high S/N (Signal/Noise) ratio can be obtained by inputting the high-power local oscillator (LO) light compared with the signal light.

An example of such coherent optical receiver device is described in patent literature 1. The coherent optical receiver device described in patent literature 1 includes an attenuator, an optical coupler, a receiver, and a processor.

In the coherent optical receiving system, the intensity noise of the input signal and the output of the beat signal between the input signal and the local oscillator (LO) light are different in the reduction rate with attenuation of the input signal. That is to say, attenuating the power of the input signal causes the intensity noise of the input signal to drop at a faster rate than the beat signal.

For this reason, in the coherent optical receiver device in patent literature 1, it is said that the S/N ratio of the beat signal is improved by attenuating an input signal before the input signal is combined with a local oscillator (LO) signal. Furthermore, it is said that the attenuation of the input signal can be adjusted in response to real-time measurements of the S/N ratio of the beat signal by providing a feedback loop between the processor and an adjustable attenuator.

Patent literature 2 discloses a coherent optical receiver which includes an intensity adjusting means for adjusting intensity of input signal light, a converting means for converting an analog signal into a digital signal, a storage means for storing an amplitude value, and a control means for controlling the intensity adjusting means. The converting means converts the analog signal obtained by the photoelectric conversion of the combined light which is obtained by combining the signal light and the local oscillator light into the digital signal. The storage means stores a first amplitude value of the analog signal which is obtained using an input signal light with no waveform distortion as an input signal light with the local oscillator light being turned off. The control means controls the intensity adjustment value of the intensity adjusting means so that a second amplitude value of the analog signal, which is obtained using an input signal light in operation as an input signal light with the local oscillator light being turned off, will become equal to the first amplitude value. By employing such configuration, it is said that excellent reception characteristics can be achieved even if input signal light is suffering various waveform distortions.

Patent literature 1: Japanese Patent Application Laid-Open Publication No. 2001-249053 (paragraphs [0007]-[0016])
Patent literature 2: Japanese Patent Application Laid-Open Publication No. 2009-212994 (paragraphs [0017] and [0018])

DISCLOSURE OF INVENTION

Problem to be Solved by the Invention

In the coherent optical transmission system, since the high-power local oscillator (LO) light is being input at all times unlike the IM-DD (Intensity Modulation-Direct Detection) system, the power dynamic range of the input signal light is limited. In other words, if the output power of the local oscillator (LO) light is turned up in order to improve the minimum receiver sensitivity characteristics, the receivable maximum input power becomes smaller. Therefore, the relation of the improvement in the minimum receiver sensitivity and the extension of the transmission distance to the input dynamic range becomes trade-off. And in the related coherent optical receiver, there is a problem that the dynamic range of the optical input power becomes smaller compared with the receiver of the IM-DD system due to the rating of the photodiode (PD) and the limitation of the amplification factor of the transimpedance amplifier (TIA).

If the dynamic range becomes smaller, it becomes less able to absorb the influence caused by the loss fluctuation of an optical filter in an optical communication system such as an ROADM (Reconfigurable Optical Add/Drop Multiplexer) filter or by the wavelength loss fluctuation due to an EDFA (Erbium Doped Fiber Amplifier). For that reason, there is a problem that it becomes difficult to design the whole optical communication system and the related coherent optical receiver cannot be applied to the current system.

On the other hand, the coherent optical transmission system has the feature that it can receive only a signal in the wavelength channel matched with the frequency of the local oscillator (LO) light. An optical FDM (Frequency Division Multiplexing) receiving system has been considered in which it is performed using such feature to input directly optical multiplexed signals (multichannel) in the WDM (Wavelength Division Multiplexing) system into a coherent receiver without passing through an optical filter and to select the intended channel signal by the wavelength of the local oscillator (LO) light.

However, if the related coherent optical receiver is used in the optical communication system in which an optical filter such as an optical DMUX (De-multiplexer) filter is not used in the same way as the optical FDM receiving system, there is a problem that the dynamic range of the optical input power becomes even narrower. The reason is that the average input power of the coherent optical receiver increases because the optical signals in a plurality of channels are input in a lump which includes an optical signal in an unwanted channel which is not used as a channel signal.

As described above, in the related coherent optical receiver, there is a problem that the dynamic range of the optical input power decreases, in particular, the dynamic rage remarkably decreases in the case of selectively receiving the optical multiplexed signals by means of the wavelength of the local oscillator light.

The object of the present invention is to provide a coherent optical receiver device and a coherent optical receiving method which solve the problem mentioned above that, in a related coherent optical receiver, the dynamic range considerably decreases in the case of selectively receiving the optical multiplexed signals by means of the wavelength of the local oscillator light.

Means for Solving a Problem

A coherent optical receiver device according to an exemplary aspect of the invention includes a coherent optical receiver receiving optical multiplexed signals in a lump in which signal light is multiplexed; a variable optical attenuator; a local oscillator connected to the coherent optical receiver; and a first controller controlling the variable optical attenuator by means of a first control signal based on an output signal of the coherent optical receiver; wherein the coherent optical receiver includes a 90-degree hybrid circuit, a photoelectric converter, and an impedance conversion amplifier, and selectively detects the signal light interfering with local oscillation light output by the local oscillator out of the optical multiplexed signals; and the variable optical attenuator is disposed in the optical path of the optical multiplexed signals in a stage preceding the photoelectric converter, inputs the optical multiplexed signals, and outputs them to the coherent optical receiver controlling the intensity of the optical multiplexed signals based on the first control signal.

A coherent optical receiving method according to an exemplary aspect of the invention includes the steps of: receiving optical multiplexed signals in a lump in which signal light is multiplexed; selectively detecting the signal light interfering with local oscillation light out of the optical multiplexed signals, and outputting a signal after detection; and controlling the intensity of the optical multiplexed signals based on the signal after detection.

Effect of the Invention

According to the coherent optical receiver device and the coherent optical receiving method by the present invention, it is possible to secure a sufficient dynamic range even if the optical multiplexed signal is selectively received by means of the wavelength of the local oscillation light.

DESCRIPTION OF EMBODIMENTS

The exemplary embodiments of the present invention will be described with reference to drawings below.

The First Exemplary Embodiment

Figure 1:
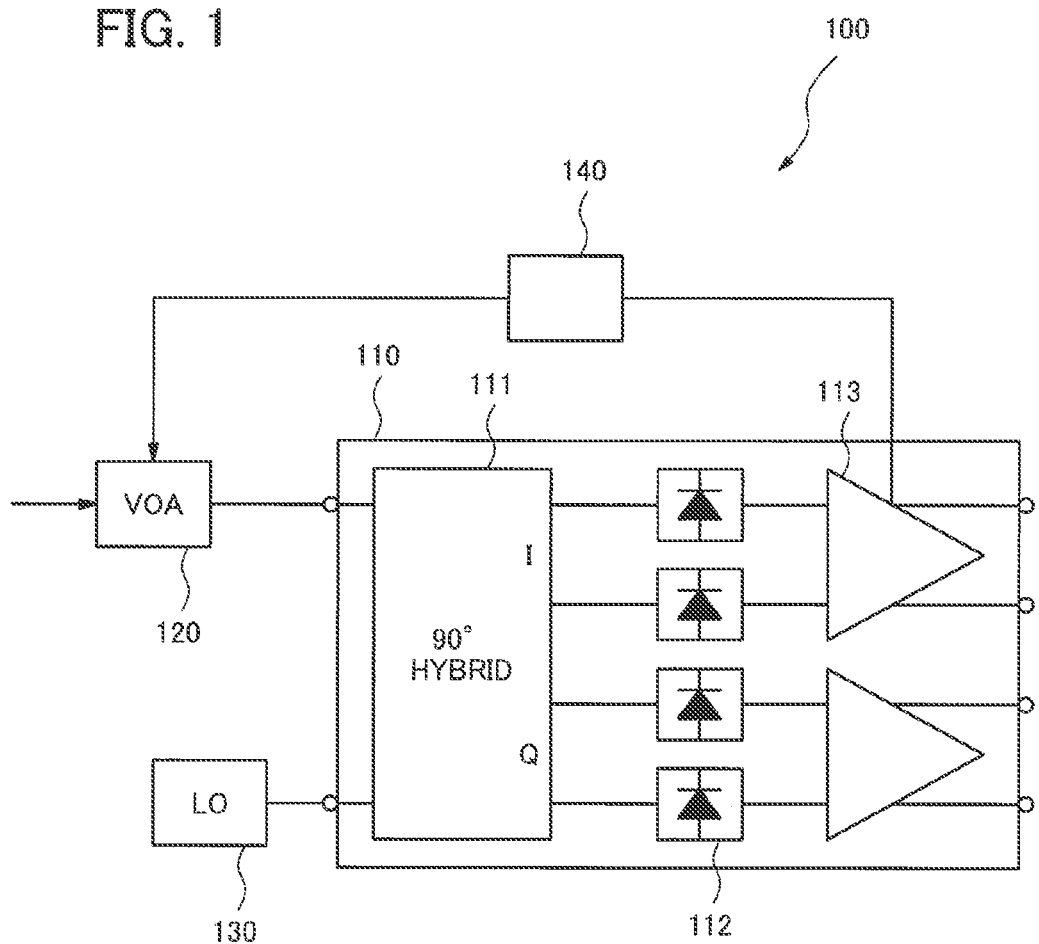
FIG. 1 is a block diagram showing a configuration of a coherent optical receiver device in accordance with the first exemplary embodiment of the present invention.

FIG. 1 is a block diagram showing a configuration of the coherent optical receiver device 100 in accordance with the first exemplary embodiment of the present invention. The coherent optical receiver device 100 includes a coherent optical receiver 110, a variable optical attenuator (VOA) 120, a local oscillator (LO) 130 connected to the coherent optical receiver 110, and a first controller 140.

The coherent optical receiver 110 includes 90-degree hybrid circuit 111, a photoelectric converter 112, and an impedance conversion amplifier 113. The coherent optical receiver 110 receives optical multiplexed signals in a lump in which signal light is multiplexed, selectively detects the signal light interfering with the local oscillation light output by the local oscillator (LO) 130 out of the optical multiplexed signals, and outputs the signal after detection.

The first controller 140 controls the variable optical attenuator (VOA) 120 by means of a first control signal based on the output signal of the coherent optical receiver 110. For example, the first control signal is determined based on the amplitude information obtained from the output signal of the impedance conversion amplifier 113, and the attenuation degree of the variable optical attenuator (VOA) 120 is controlled by the first control signal at that time.

The variable optical attenuator (VOA) 120 is disposed in the optical path of the optical multiplexed signals in a stage preceding the photoelectric converter 112, inputs the optical multiplexed signals, and outputs them to the coherent optical receiver 110 controlling the intensity of the optical multiplexed signals based on the first control signal.

Figure 2:
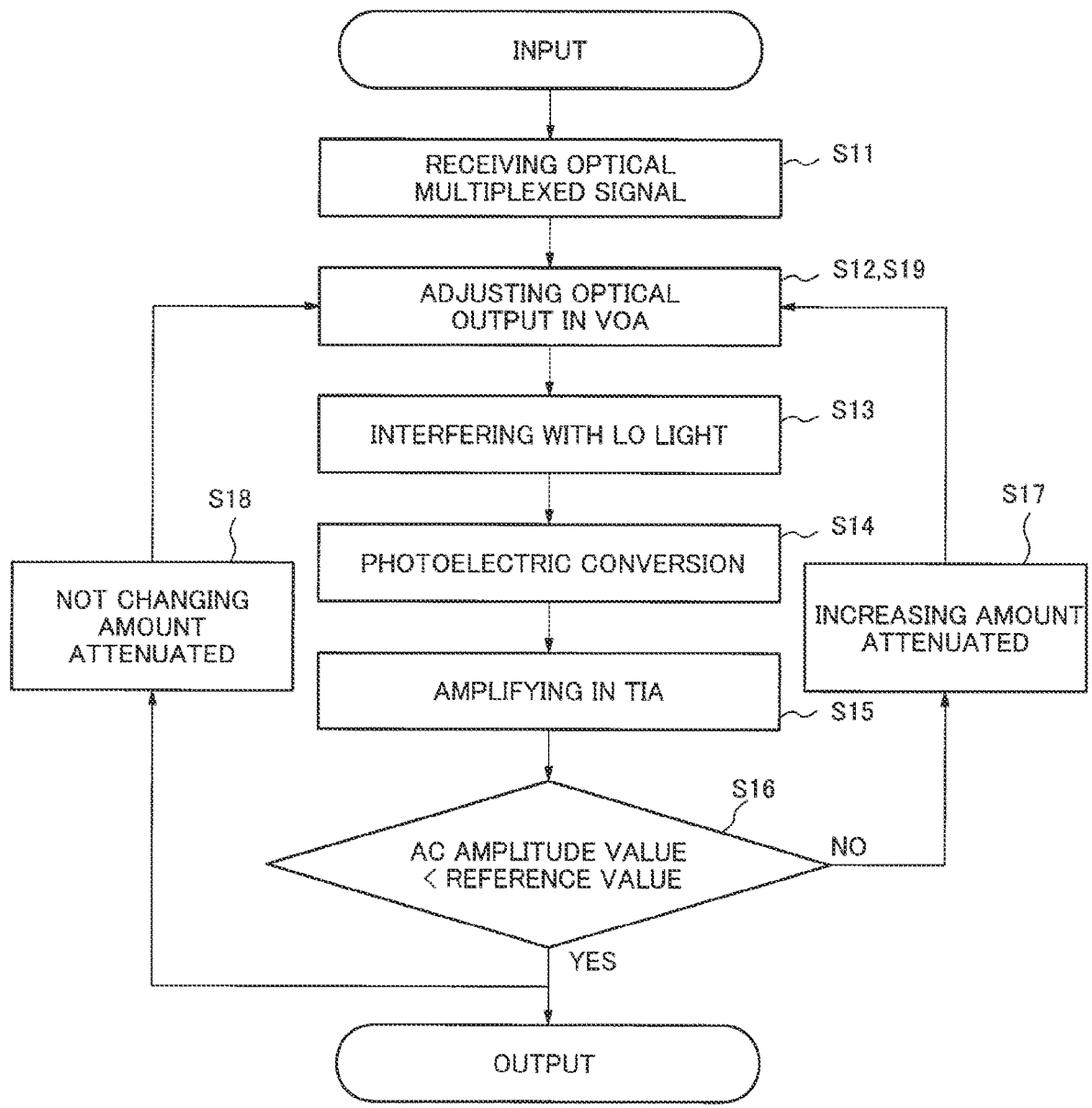
FIG. 2 is a flowchart showing an operation of a coherent optical receiver device in accordance with the first exemplary embodiment of the present invention.

Next, the operation of the coherent optical receiver device 100 in the present exemplary embodiment will be described using FIG. 2. FIG. 2 is a flowchart showing the operation of the coherent optical receiver device 100 in the present exemplary embodiment. First, the coherent optical receiver device 100 receives optical multiplexed signal in the variable optical attenuator (VOA) 120 (step S11). The variable optical attenuator (VOA) 120 adjusts the intensity of the optical output of the optical multiplexed signal (step S12), and outputs it to the 90-degree hybrid circuit in the coherent optical receiver 110.

The 90-degree hybrid circuit 111 makes the input optical multiplexed signal interfere with the local oscillation light output from the local oscillator (LO) 130 (step S13), and then the photoelectric converter 112 performs the photoelectric conversion (step S14). At that time, the signal light which interferes with the local oscillation light output by the local oscillator (LO) 130 is selectively detected out of the optical multiplexed signals. The impedance conversion amplifier (transimpedance amplifier: TIA) 113 amplifies the electric signal converted photoelectrically and outputs it (step S15).

The first controller 140 compares the output signal of the impedance conversion amplifier (TIA) 113, for example, an AC amplitude value, with a predetermined reference value (step S16), and compared results are regarded as amplitude information. If the AC amplitude value is equal to or larger than the reference value (step S16/NO), the first controller 140 controls the variable optical attenuator (VOA) 120 using the first control signal which is determined based on the amplitude information at that time so as to increase the amount attenuated and decrease the optical output (step S17). In contrast, if the AC amplitude value is smaller than the reference value (step S16/YES), the first controller 140 controls the variable optical attenuator (VOA) 120 using the first control signal which is determined based on the amplitude information at that time so as not to change the amount attenuated (step S18).

The variable optical attenuator 120 controls the intensity of the optical multiplexed signal based on the first control signal (step S19) and outputs it to the coherent optical receiver 110.

By adopting such configuration, according to the coherent optical receiver device 100 in the present exemplary embodiment, it is possible to control the intensity of the input optical multiplexed signals based on the intensity of the optical signal detected selectively (channel) out of the optical multiplexed signals. Therefore, it is possible to optimize the dynamic range with respect to each selected signal light (channel). Consequently, it becomes possible to secure a sufficient dynamic range even if the optical multiplexed signal is selectively received by means of the wavelength of the local oscillation light.

In contrast, in the related coherent optical receiver device described in the background art, the average input optical power is merely monitored in case of inputting the optical multiplexed signals. However, since the intended signal light is only a part of the received whole optical signal, it is impossible for the related coherent optical receiver device to detect the optical output of the intended signal light. Hence, it is impossible for the related coherent optical receiver device to improve the dynamic range of the input light in case of selectively receiving the optical multiplexed signal by means of the wavelength of the local oscillation light.

Although the case has been illustrated in FIG. 1 in which the variable optical attenuator (VOA) 120 is disposed in the optical path of the optical multiplexed signals in a stage preceding the coherent optical receiver 110, it is not limited to this, it is also acceptable to dispose it in other locations as long as in the optical path of the optical multiplexed signals in a stage preceding the photoelectric converter 112.

Here, the photoelectric converter 112 and the impedance conversion amplifier 113, which compose the coherent optical receiver 110, can adopt the differential type configuration, respectively. At that time, 90-degree hybrid circuit 111 inputs the optical multiplexed signals and the local oscillation light and makes them interfere, and outputs a normal-phase optical signal and a reversed-phase optical signal to the photoelectric converter 112 respectively. And then, the photoelectric converter 112 photoelectrically converts the normal-phase optical signal and outputs the normal-phase electric signal to the impedance conversion amplifier 113, and photoelectrically converts the reversed-phase optical signal and outputs the reversed-phase electric signal to the impedance conversion amplifier 113. By adopting the differential configuration, it is possible to eliminate signal light other than the selected signal light, that is, an optical signal in an unwanted channel.

Figure 3:
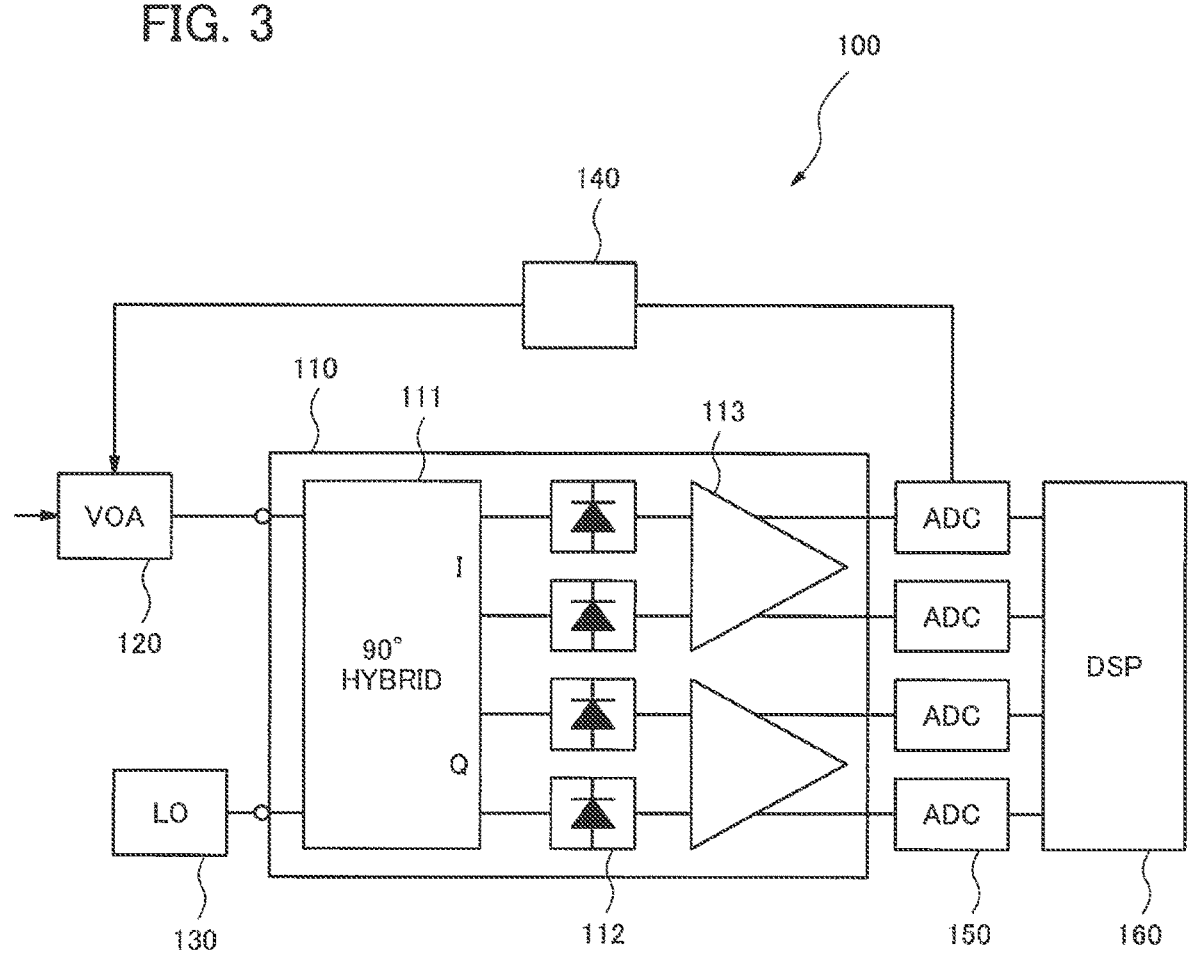
FIG. 3 is a block diagram showing another configuration of the coherent optical receiver device in accordance with the first exemplary embodiment of the present invention.
Figure 4:
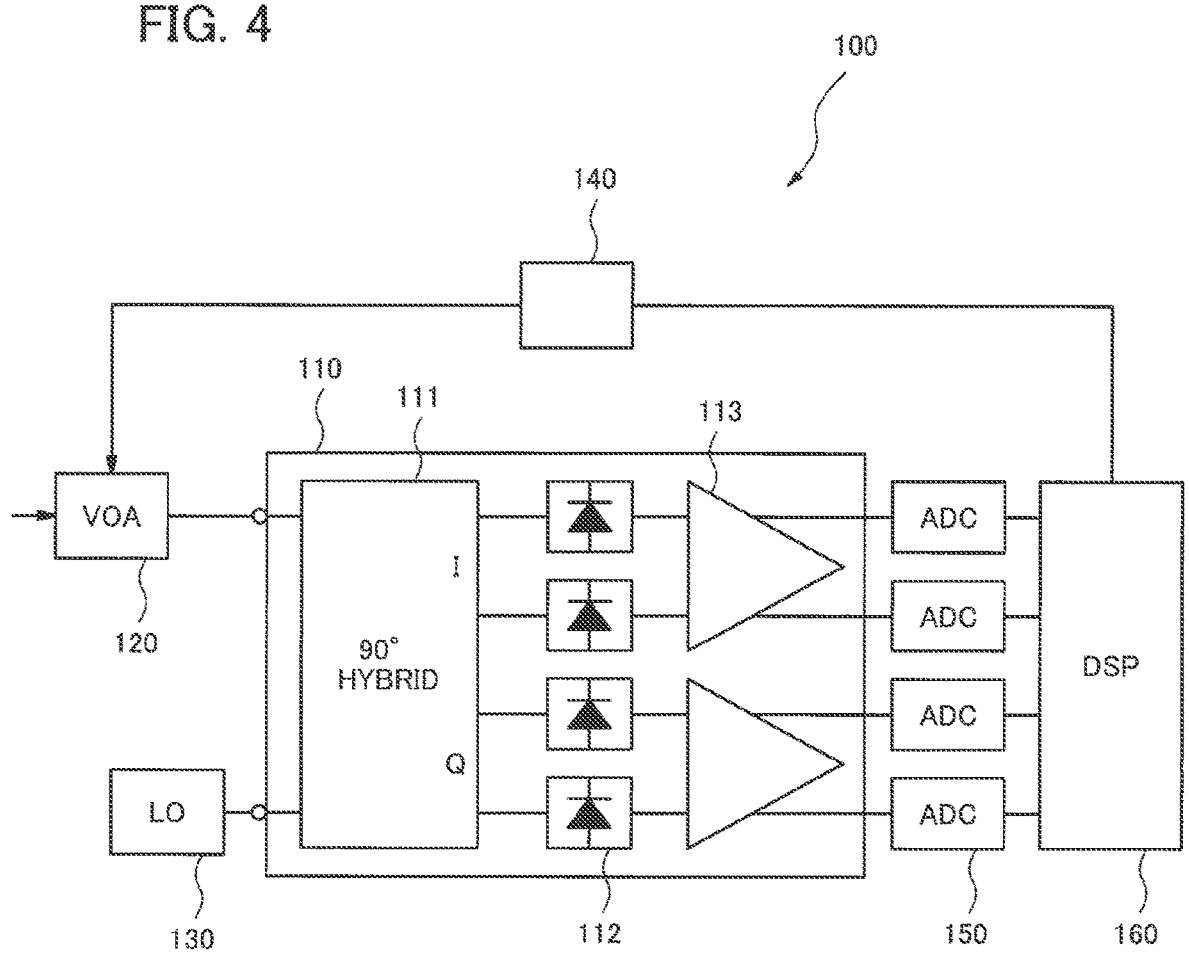
FIG. 4 is a block diagram showing still another configuration of the coherent optical receiver device in accordance with the first exemplary embodiment of the present invention.

As mentioned above, the first controller 140 controls the variable optical attenuator (VOA) 120 by means of the first control signal based on the output signal from the coherent optical receiver 110. The first control signal based on the output signal of the coherent optical receiver 110 includes a control signal from a signal processor disposed in a stage following the coherent optical receiver 110. That is to say, the coherent optical receiver device 100 in the present exemplary embodiment can be configured which includes an analog-to-digital converter 150 and further a digital signal processor (DSP) 160 in a stage following the coherent optical receiver 110. At that time, as shown in FIG. 3, for example, it is possible for the first controller 140 to determine a first control signal based on the amplitude information obtained from the output signal of the analog-to-digital converter (ADC) 150 and to control the variable optical attenuator (VOA) 120 by means of the first control signal at that time. As shown in FIG. 4, it is also acceptable to determine a first control signal based on the amplitude information obtained from the output signal of the digital signal processor (DSP) 160 and to control the variable optical attenuator (VOA) 120 by means of the first control signal at that time. In this case, it is possible to mount the first controller 140 and the digital signal processor (DSP) 160 on the same integrated circuit element.

The Second Exemplary Embodiment

Figure 5:
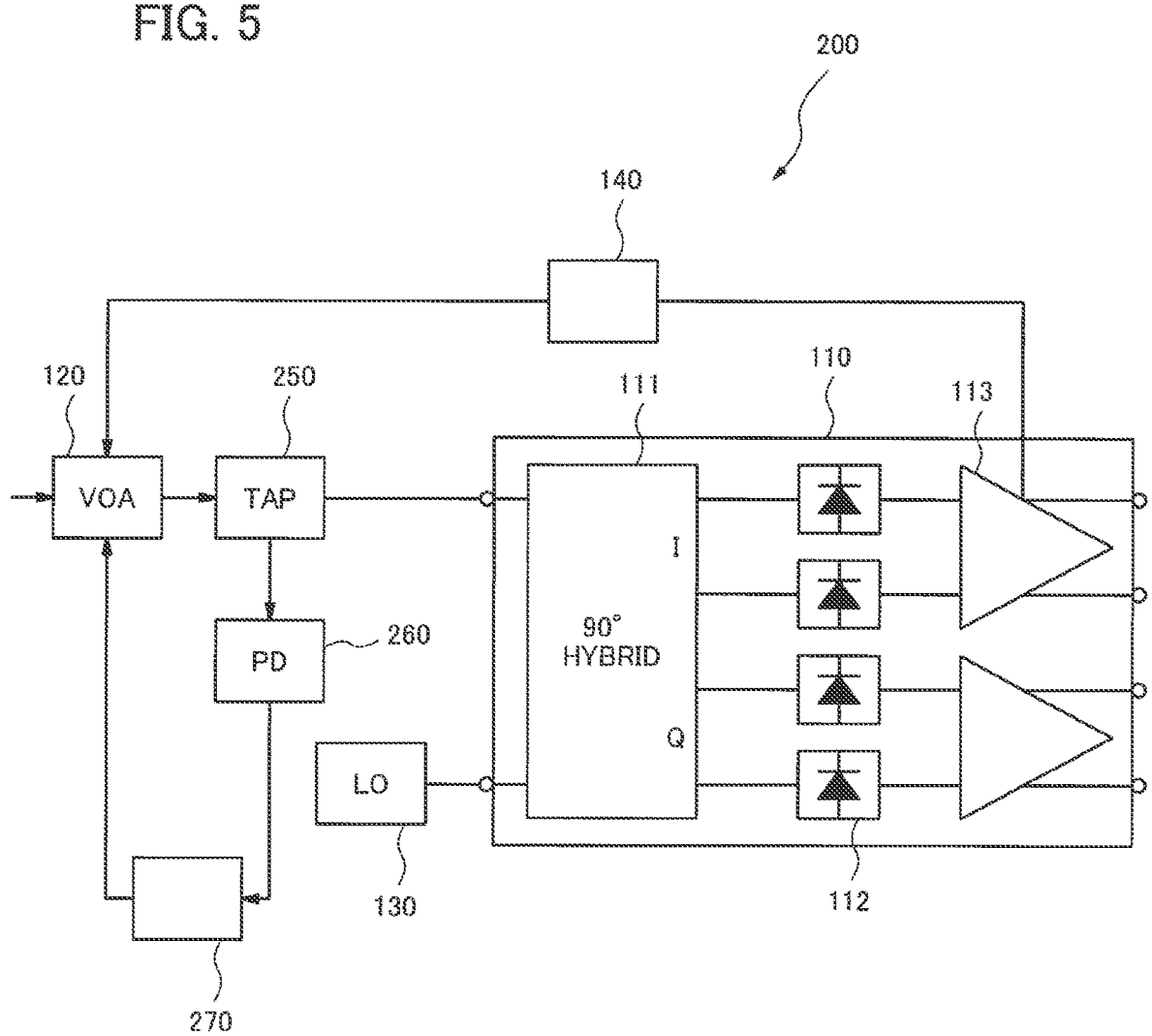
FIG. 5 is a block diagram showing a configuration of the coherent optical receiver device in accordance with the second exemplary embodiment of the present invention.

Next, the second exemplary embodiment of the present invention will be described. FIG. 5 is a block diagram showing a configuration of the coherent optical receiver device 200 in accordance with the second exemplary embodiment of the present invention. The coherent optical receiver device 200 includes the coherent optical receiver 110, the variable optical attenuator (VOA) 120, the local oscillator (LO) 130 connected to the coherent optical receiver 110, and the first controller 140.

The coherent optical receiver 110 includes the 90-degree hybrid circuit 111, the photoelectric converter 112, and the impedance conversion amplifier 113. The coherent optical receiver 110 receives optical multiplexed signals in a lump in which signal light is multiplexed, selectively detects the signal light interfering with the local oscillation light output by the local oscillator (LO) 130 out of the optical multiplexed signals, and outputs the signal after detection.

The first controller 140 controls the variable optical attenuator (VOA) 120 by means of the first control signal based on the output signal of the coherent optical receiver 110. For example, the first control signal is determined based on the amplitude information obtained from the output signal of the impedance conversion amplifier 113, and the attenuation degree of the variable optical attenuator (VOA) 120 is controlled by the first control signal at that time.

The variable optical attenuator (VOA) 120 is disposed in the optical path of the optical multiplexed signals in a stage preceding the photoelectric converter 112, inputs the optical multiplexed signals, and outputs them to the coherent optical receiver 110 controlling the intensity of the optical multiplexed signals based on the first control signal.

The configuration above is similar to that of the coherent optical receiver device 100 in the first exemplary embodiment. The coherent optical receiver device 200 in the present exemplary embodiment further includes a splitter (TAP) 250 which extracts a part of the optical multiplexed signals output from the variable optical attenuator (VOA) 120 to the 90-degree hybrid circuit 111, a photodetector 260, and a second controller 270.

The photodetector 260 converts the optical multiplexed signals input from the splitter (TAP) 250 into an electric signal and outputs the electric signal at that time to the second controller 270 as a light-receiving signal. The second controller 270 controls the attenuation degree of the variable optical attenuator (VOA) 120 by means of a second control signal based on the light-receiving signal obtained from the photodetector (PD) 260. At that time, the variable optical attenuator (VOA) 120 controls the intensity of the optical multiplexed signals based on the second control signal, and outputs them to the coherent optical receiver 110.

Therefore, according to the coherent optical receiver device 200 in the present exemplary embodiment, it becomes possible to control the variable optical attenuator (VOA) 120 based on the intensity of all received optical multiplexed signals (all channels) in addition to the intensity of the optical signal detected selectively (channel) out of the optical multiplexed signals. Therefore, it is possible to prevent the excessive optical signal from inputting into the photoelectric converter 112 in the coherent optical receiver 110.

Figure 6:
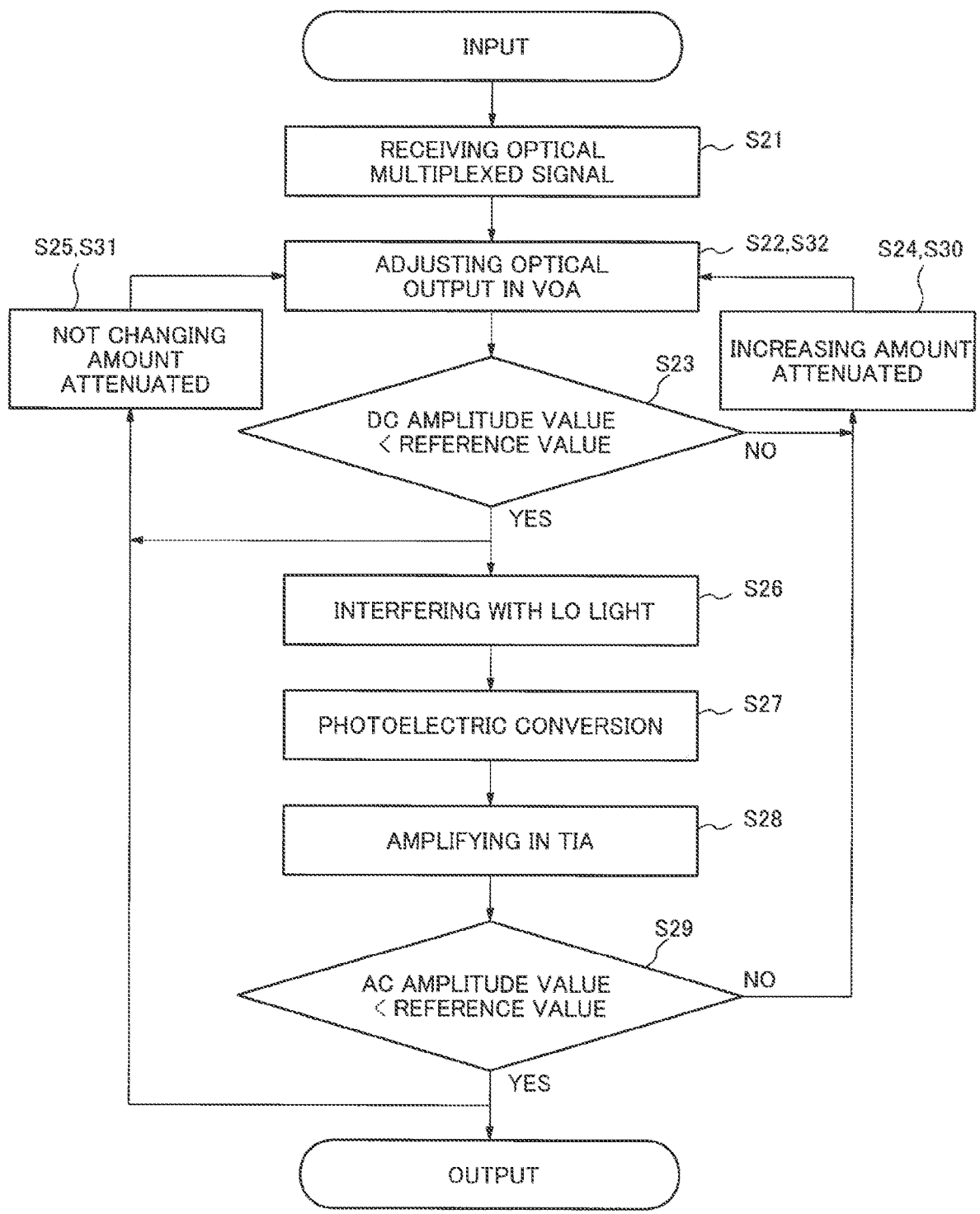
FIG. 6 is a flowchart showing an operation of the coherent optical receiver device in accordance with the second exemplary embodiment of the present invention.

Next, the operation of the coherent optical receiver device 200 in the present exemplary embodiment will be described using FIG. 6. FIG. 6 is a flowchart showing the operation of the coherent optical receiver device 200 in the present exemplary embodiment. First, the coherent optical receiver device 200 receives optical multiplexed signal in the variable optical attenuator (VOA) 120 (step S21). The variable optical attenuator (VOA) 120 adjusts the intensity of the optical output of the optical multiplexed signal (step S22), and outputs it to the splitter (TAP) 250.

The splitter (TAP) 250 extracts a part of the optical multiplexed signals output from the variable optical attenuator (VOA) 120 to the 90-degree hybrid circuit 111, and outputs it to the photodetector 260. The photodetector 260 converts the optical multiplexed signal input from the splitter (TAP) 250 into an electric signal and outputs it to the second controller 270 as a light-receiving signal.

The second controller 270 compares the light-receiving signal obtained from the photodetector (PD) 260, for example, a direct current (DC) amplitude value, with a predetermined reference value (step S23). If the DC amplitude value is equal to or larger than the reference value (step S23/NO), the second controller 270 controls the variable optical attenuator (VOA) 120 using the second control signal which is determined by the light-receiving signal at that time so as to increase the amount attenuated and decrease the optical output (step S24). In contrast, if the DC amplitude value is smaller than the reference value (step S23/YES), the second controller 270 controls the variable optical attenuator (VOA) 120 using the second control signal which is determined by the light-receiving signal at that time so as not to change the amount attenuated (step S25).

The 90-degree hybrid circuit 111 makes the input optical multiplexed signal interfere with the local oscillation light output from the local oscillator (LO) 130 (step S26), and then the photoelectric converter 112 performs the photoelectric conversion (step S27). At that time, the signal light which interferes with the local oscillation light output by the local oscillator (LO) 130 is selectively detected out of the optical multiplexed signals. The impedance conversion amplifier (TIA) 113 amplifies the electric signal converted photoelectrically and outputs it (step S28).

The first controller 140 compares the output signal of the impedance conversion amplifier (TIA) 113, for example, an AC amplitude value, with a predetermined reference value (step S29), and compared results are regarded as amplitude information. If the AC amplitude value is equal to or larger than the reference value (step S29/NO), the first controller 140 controls the variable optical attenuator (VOA) 120 using the first control signal which is determined based on the amplitude information at that time so as to increase the amount attenuated and decrease the optical output (step S30). In contrast, if the AC amplitude value is smaller than the reference value (step S29/YES), the first controller 140 controls the variable optical attenuator (VOA) 120 using the first control signal which is determined based on the amplitude information at that time so as not to change the amount attenuated (step S31).

The variable optical attenuator 120 controls the intensity of the optical multiplexed signal based on the first control signal and the second control signal (step S32) and outputs it to the coherent optical receiver 110.

As described above, according to the coherent optical receiver device 200 in the present exemplary embodiment, it is possible to secure a sufficient dynamic range and to protect the photoelectric converter 112 even if the optical multiplexed signal is selectively received by means of the wavelength of the local oscillation light.

In FIG. 5, the case has been illustrated in which the variable optical attenuator (VOA) 120 and the splitter (TAP) 250 are disposed in the optical path of the optical multiplexed signals in a stage preceding the coherent optical receiver 110. However, it is not limited to this, it is also acceptable to dispose them in other locations as long as in the optical path of the optical multiplexed signals in a stage preceding the photoelectric converter 112.

As mentioned above, in the present exemplary embodiment, the first controller 140 determines the first control signal based on the amplitude information which is obtained from the output signal of the impedance conversion amplifier (TIA) 113, and controls the variable optical attenuator (VOA) 120 by means of the first control signal at that time. However, it is not limited to this; it is also acceptable to use the amplitude information obtained from the output signal of the analog-to-digital converter 150 or the digital signal processor (DSP) 160, as is the case with the first exemplary embodiment.

The Third Exemplary Embodiment

Next, the third exemplary embodiment of the present invention will be described. In the present exemplary embodiment, a case will be described as an example in which the dual polarization quadrature phase shift keying (DP-QPSK) system is employed as a modulation method.

Figure 7:
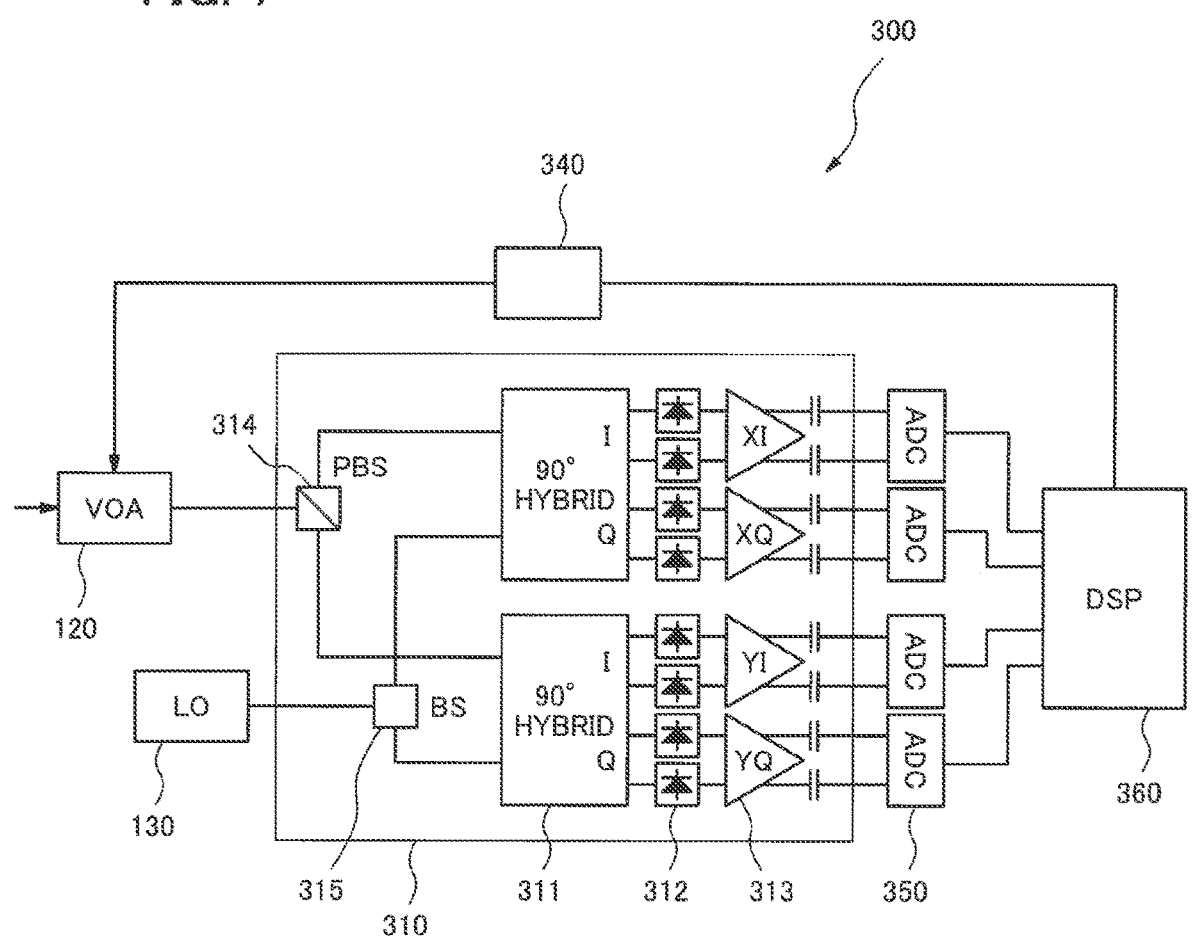
FIG. 7 is a block diagram showing a configuration of the coherent optical receiver device in accordance with the third exemplary embodiment of the present invention.

FIG. 7 is a block diagram showing a configuration of a coherent optical receiver device 300 in accordance with the third exemplary embodiment of the present invention. The coherent optical receiver device 300 includes a coherent optical receiver 310, the variable optical attenuator (VOA) 120, the local oscillator (LO) 130 connected to the coherent optical receiver 310, and a first controller 340.

The coherent optical receiver 310 includes a 90-degree hybrid circuit 311, a photoelectric converter 312, and an impedance conversion amplifier 313. The coherent optical receiver 310 receives optical multiplexed signals in a lump in which signal light is multiplexed, selectively detects the signal light interfering with the local oscillation light output by the local oscillator (LO) 130 out of the optical multiplexed signals, and outputs the signal after detection. The variable optical attenuator (VOA) 120 is disposed in the optical path of the optical multiplexed signal in a stage preceding the photoelectric converter 312, inputs the optical multiplexed signal, and outputs it controlling the intensity of the optical multiplexed signal based on a first control signal from the first controller 340. The configuration above is similar to that of the coherent optical receiver device 100 in the first exemplary embodiment.

The coherent optical receiver device 300 in the present exemplary embodiment further includes an analog-to-digital converter (ADC) 350 and a digital signal processor (DSP) 360 in a stage following the coherent optical receiver 310. The first controller 340 determines the first control signal based on the amplitude information obtained from the output signal of the digital signal processor (DSP) 360, and controls the variable optical attenuator (VOA) 120 by means of the first control signal at that time.

The configuration of the coherent optical receiver device 300 will be described below more specifically. As shown in FIG. 7, phase-modulated optical multiplexed signals are input in a lump into the coherent optical receiver device 310 from its signal light input port. On the other hand, local oscillation light is input from the local oscillator (LO) 130 at its local oscillation (LO) light port. The coherent optical receiver 310 includes a polarization beam splitter (PBS) 314 in an input side of the signal light and a beam splitter (BS) 315 in an input side of the local oscillation light.

The variable optical attenuator (VOA) 120 inputs the optical multiplexed signal (multichannel), adjusts it within the range of an intended optical output by attenuating the intensity of the optical multiplexed signal based on the first control signal from the first controller 340, and outputs it to the coherent optical receiver 310.

The optical multiplexed signal whose optical output is adjusted is separated into two polarized light beams by the polarization beam splitter (PBS) 314 composing the coherent optical receiver 310, which are input into the 90-degree hybrid circuits (90-Hybrid) 311 respectively. The optical multiplexed signal is separated into an in-phase component (I) and a quadrate-phase component (Q) in the 90-degree hybrid circuit 311, each of which is fed by the differential input into a photodiode (PD) as the photoelectric converter 312. In more detail, the beat output composed of the optical multiplexed signal and the local oscillator (LO) light is branched by diversity branch with respect to each of the polarization, the phase, and the intensity, then each of eight kinds of optical signals in total is input into the photodiode (PD).

Only the AC signal component is extracted by a differential amplifier as the impedance conversion amplifier 313, and is amplified to the output amplitude suitable for the analog-to-digital converter (ADC) 350 in the following stage. After that, those signals are converted by each of four analog-to-digital converters (ADC) 350 into digital signals, and are processed as signals mapped onto two I/Q planes in the digital signal processor (DSP) 360.

The digital signal processor (DSP) 360 performs a process so that the output amplitude of the analog-to-digital converter (ADC) 350 may become constant. The first controller 340 determines the first control signal by using a processing signal at that time, and controls the variable optical attenuator (VOA) 120 by the first control signal at that time. The variable optical attenuator (VOA) 120 adjusts the optical multiplexed signal within the range of an intended optical output by attenuating its intensity based on the first control signal.

In this way, by means of placing the variable optical attenuator (VOA) which controls the optical power based on the output amplitude of the analog-to-digital converter (ADC) 350, it is possible to control the optical power input into the coherent optical receiver based on the intensity of the selected signal light. Accordingly, it is possible to enlarge the power dynamic range in which the coherent optical receiver is available for receiving.

Although the case has been illustrated in FIG. 7 in which the variable optical attenuator (VOA) 120 is disposed in the optical path of the optical multiplexed signals in a stage preceding the coherent optical receiver 310, it is not limited to this, it is also acceptable to dispose it in other locations as long as in the optical path of the optical multiplexed signals in a stage preceding the photoelectric converter 312.

As described above, according to the coherent optical receiver device 300 in the present exemplary embodiment, it is possible to control the intensity of the input optical multiplexed signals based on the intensity of the optical signal detected selectively (channel) out of the optical multiplexed signals. Therefore, it is possible to optimize the dynamic range with respect to each selected signal light (channel). Consequently, it becomes possible to secure a sufficient dynamic range even if the optical multiplexed signal is selectively received by means of the wavelength of the local oscillation light.

Figure 8:
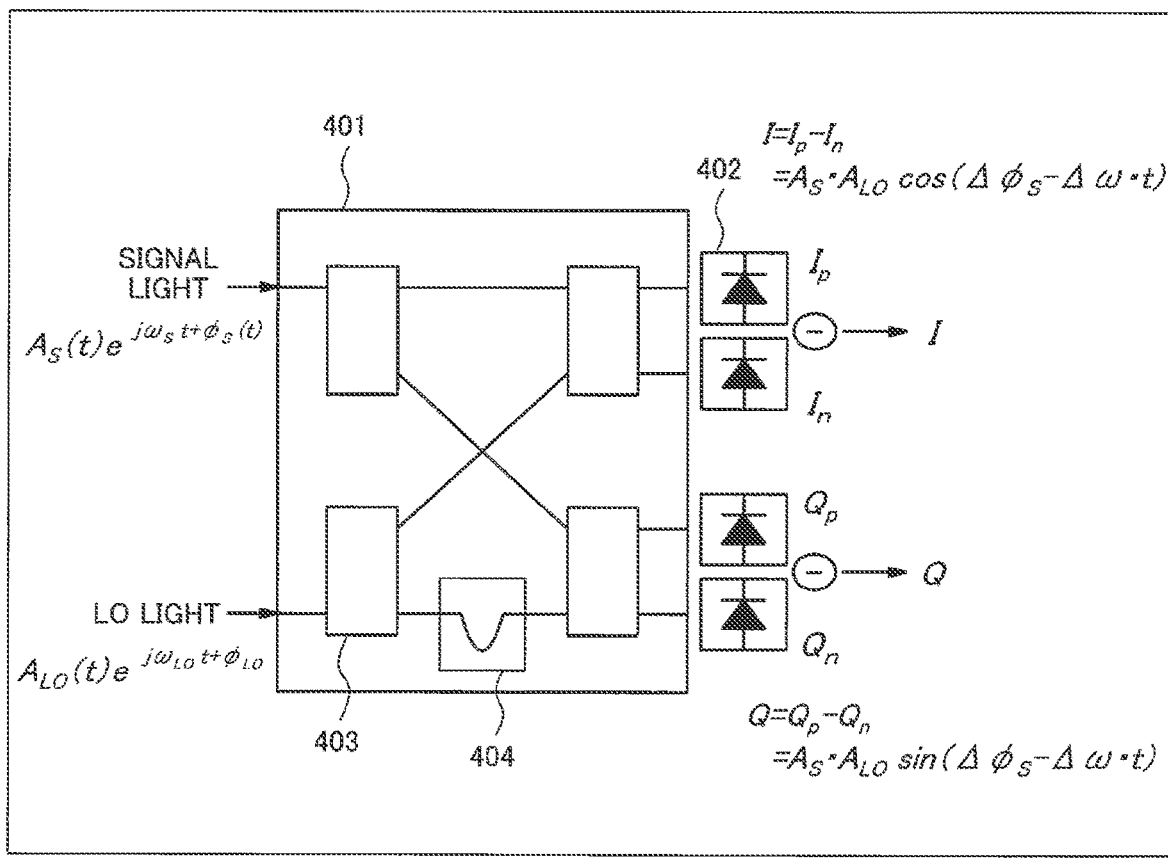
FIG. 8 is a schematic view to illustrate the principle of the coherent optical receiving system in accordance with the third exemplary embodiment of the present invention.

FIG. 8 is a schematic view to illustrate the principle of the coherent optical receiving system in the present exemplary embodiment. In the coherent optical receiving system, the local oscillation (LO) light and the signal light are mixed in a 90-degree hybrid circuit 401, and a differential-type photodiode (PD) 402 receives the mixed light. In FIG. 8, a configuration without polarization demultiplexing will be described for simplicity.

In the QPSK modulation system, the information is provided for the phase of the signal light. It is possible to detect the light intensity and the phase information by mixing signal light and local oscillation (LO) light with its frequency the same. At that time, one of the signal light is mixed with the local oscillation (LO) light without change in the optical coupler 403, and the other one is mixed with the local oscillation (LO) light which has passed through the 90-degree phase differential unit 404. As a result, it is possible to obtain the cosine (cos) component and the sine (sin) component of the phase information respectively. It is found by receiving those optical signals in the photodiode (PD) 402 which phase each optical signal exists in at the moment. Such coherent optical receiving system has the following feature. That is to say, it is possible to correct the frequency fluctuation of the signal light or the local oscillation (LO) light by means of the digital signal processing, and to compensate the chromatic dispersion or the polarization mode dispersion by using the phase information by means of the digital signal processing.

Figure 9:
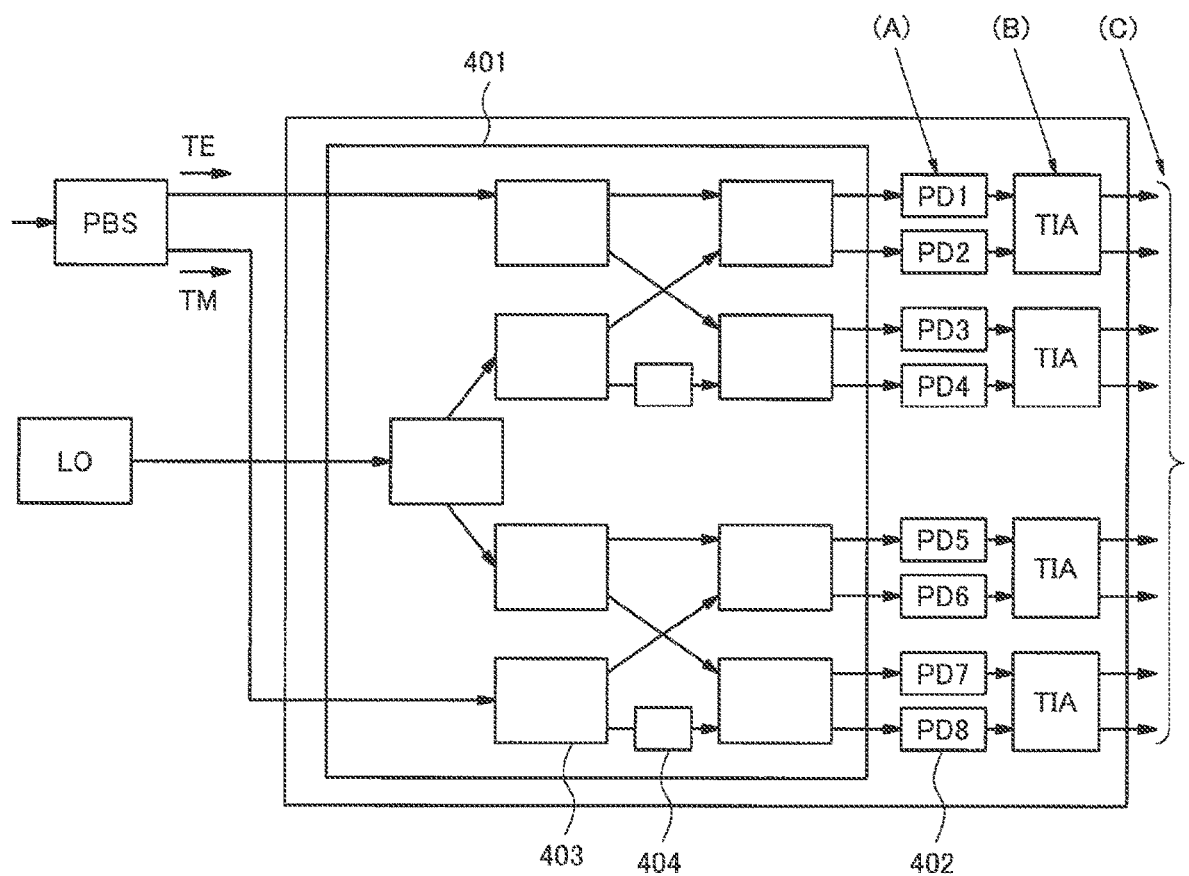
FIG. 9 is a block diagram showing a configuration of the related coherent optical receiver to illustrate device limiting factors.

Next, device limiting factors of the related coherent optical receiver will be described. FIG. 9 is a block diagram showing a configuration of the related coherent optical receiver to illustrate device limiting factors. As shown in the figure, the maximum input power of the actual optical signal is determined by the maximum input limitation of a photodiode (PD) (A), an amplification factor of an impedance conversion amplifier (TIA) (B), and a limiting condition of the signal output amplitude (C). Only the maximum amplification factor of TIA (B) becomes a problem if the input optical power is small. However, if the input power is large, the maximum input limitation (maximum input rating) of a PD (A), the minimum amplification factor of a TIA (B), and the maximum value of the signal output amplitude (C) become problems.

Figure 10:
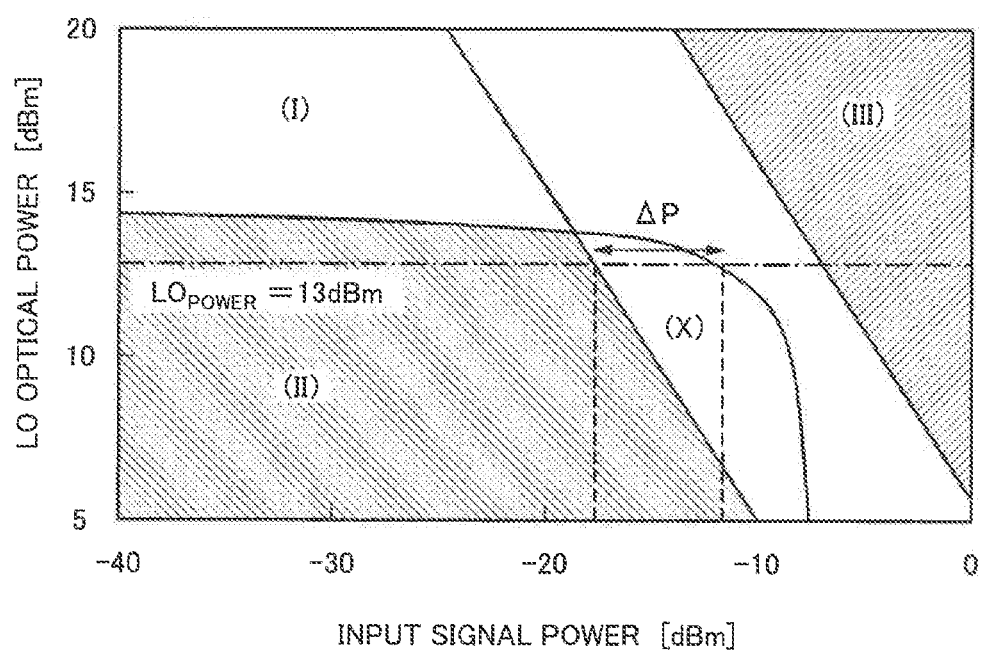
FIG. 10 is a view showing the relation between the input signal power and the local oscillation optical power in the related coherent optical receiver upon receiving optical multiplexed signals.

As a concrete example, the input limitation of the related coherent optical receiver in the case of receiving optical multiplexed signals (multichannel) will be described. FIG. 10 is a view showing the relation between the input signal power and the local oscillation optical power in the related coherent optical receiver upon receiving optical multiplexed signals. The horizontal axis represents the input signal power, the vertical axis represents the local oscillation (LO) optical power, and the figure illustrates a case in which signal light includes one hundred channels.

In FIG. 10, the area (I) represents the limitation due to the maximum rating of a PD, the area (II) represents the limitation due to the upper gain limit of a TIA, and the area (III) represents the limitation due to the lower gain limit of a TIA. It is found from the figure that an area practically usable in the optical communication system is limited to the area without the hatching (X) in the figure. The value of the range of the input optical signal powers ΔP becomes about 8 dB if the local oscillation (LO) optical power is equal to 13 dBm. If the optical input dynamic range is about 8 dB, it is difficult to design the optical communication system. Since the coherent optical receiver is configured so as to increase the receiving sensitivity by the local oscillation (LO) light, it is desirable for the power of the local oscillation (LO) light to be larger. Therefore, the range of the input optical signal power is further limited.

Here, in order to enlarge the optical input dynamic range, it can be considered to dispose the variable optical attenuator (VOA) in a stage preceding the coherent optical receiver, and to attenuate the optical input power to the receivable optical input level. However, since the optical input signals in a plurality of channels are intermingled in the case of receiving the optical multiplexed signals it is impossible to use them for the feedback control of the variable optical attenuator (VOA).

In contrast, in the coherent optical receiver device 300 of the present exemplary embodiment, the first controller is configured so as to use the output amplitude of the analog-to-digital converter (ADC) or the amplification factor of the impedance conversion amplifier (TIA) for the feedback control of the variable optical attenuator (VOA). As a result, since it is possible to detect the control signal based on the optical signal in one channel, it becomes possible to control the variable optical attenuator (VOA) appropriately and to enlarge the dynamic range.

It is also possible to use a fiber-type variable optical attenuator (VOA) or a planar lightwave circuit (PLC) type variable optical attenuator (VOA) as the variable optical attenuator (VOA) 120 in the above-mentioned exemplary embodiments. In addition, an integrated-type variable optical attenuator (VOA) is also available which is integrated with a coherent optical receiver.

The present invention is not limited to the above-mentioned exemplary embodiments and can be variously modified within the scope of the invention described in the claims. It goes without saying that these modifications are also included in the scope of the invention.

This application is based upon and claims the benefit of priority from Japanese Patent Application No. 2010-258021, filed on Nov. 18, 2010, the disclosure of which is incorporated herein in its entirety by reference.

DESCRIPTION OF THE CODES 100, 200, 300 coherent optical receiver device
110, 310 coherent optical receiver
111, 311, 401 90-degree hybrid circuit
112, 312 photoelectric converter
113, 313 impedance conversion amplifier
120 variable optical attenuator (VOA)
130 local oscillator (LO)
140, 340 first controller
250 splitter (TAP)
260 photodetector
270 second controller
314 polarization beam splitter (PBS)
315 beam splitter (BS)
150, 350 analog-to-digital converter (ADC)
160, 360 digital signal processor (DSP)
402 photodiode (PD)
403 optical coupler
404 90-phase differential unit

What is claimed is:

1. An optical module, comprising:
an optical light source configured to output local oscillation light;
a variable optical attenuator configured to attenuate input multiplexed signals including a plurality of optical signals;
a coherent hybrid mixer configured to receive one of the plurality of optical signals by interfering with the local oscillation light; and
a photoelectric converter configured to convert the received optical signal into a converted signal,
wherein the variable optical attenuator is further configured to attenuate the input multiplexed signals based on both an electrical signal and total optical intensity of the input multiplexed signals, the electrical signal being downstream of the photoelectric converter.

2. The optical module of claim 1, further comprising:
an optical splitter configured to obtain a part of the optical intensity of the input multiplexed signals; and
an optical power monitor configured to monitor the part of the optical intensity,
wherein the variable optical attenuator is further configured to attenuate the input multiplexed signals based on amplitude of the electrical signal and a monitoring result by the optical power monitor.

3. The optical module of claim 1, further comprising:
a polarization optical splitter configured to split the input multiplexed signals into first polarization signals and second polarization signals; and
a second optical splitter configured to split the local oscillation light into a first split light and a second split light,
wherein the coherent hybrid mixer is further configured to receive one of the first polarization signals and one of the second polarization signals by interfering with the first split light and the second split light, respectively.

4. The optical module of claim 1, wherein the variable optical attenuator is further configured to attenuate the input multiplexed signals based on amplifier gain for the electrical signal.

5. The optical module of claim 1, wherein the variable optical attenuator is further configured to attenuate the input multiplexed signals based on a limit optical intensity of the photoelectric converter.

6. The optical module of claim 1, wherein the photoelectric converter comprises a photo diode.

7. The optical module of claim 1, wherein the variable optical attenuator is further configured to attenuate the input multiplexed signals based on a limit electrical amplitude of the electrical signal.

8. The optical module of claim 1, wherein the variable optical attenuator is further configured to attenuate the input multiplexed signals so as to prevent the coherent hybrid mixer from receiving an excessive optical signal.

9. A method of receiving input multiplexed signals, the input multiplexed signals comprising a plurality of optical signals and the method comprising:
outputting a local oscillation light;
attenuating the input multiplexed signals;
receiving one of the plurality of optical signals by interfering with the local oscillation light; and
converting the received optical signal into a converted signal,
wherein the attenuating of the input multiplexed signals includes attenuating the input multiplexed signals based on both an electrical signal and total optical intensity of the input multiplexed signals, the electrical signal being downstream of the converted signal.

10. The method of claim 9, further comprising:
obtaining a part of the optical intensity of the input multiplexed signals;
monitoring the part of the optical intensity; and
attenuating the input multiplexed signals based on amplitude of the electrical signal and a monitoring result.

11. The method of claim 9, further comprising:
splitting the input multiplexed signals into first polarization signals and second polarization signals;
splitting the local oscillation light into a first split light and a second split light; and
receiving one of the first polarization signals and one of the second polarization signals by interfering with the first split light and the second split light, respectively.

12. The method of claim 9, further comprising attenuating the input multiplexed signals based on amplifier gain for the electrical signal.

13. The method of claim 9, further comprising attenuating the input multiplexed signals based on a limit optical intensity of a photoelectric converter.

14. The method of claim 9, wherein the converting is performed using a photo diode.

15. The method of claim 9, further comprising attenuating the input multiplexed signals based on a limit electrical amplitude of the electrical signal.

16. The method of claim 9, wherein the receiving is performed using a coherent hybrid mixer.

17. The method of claim 9, further comprising attenuating the input multiplexed signals so as to prevent input of excessive optical signal.

* * * * *